Dec. 23, 1969 R. E. HEISE 3,485,518
DOUBLE-ENDED FASTENER
Filed Aug. 27, 1968 2 Sheets-Sheet 1
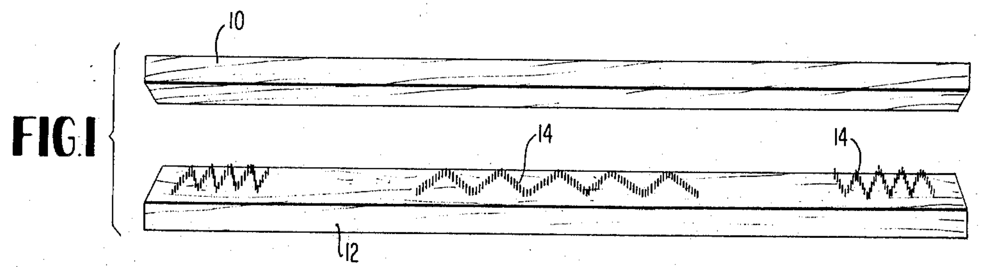
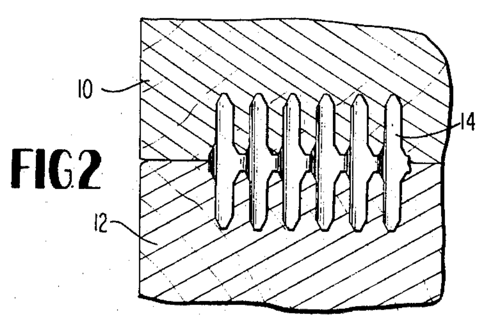
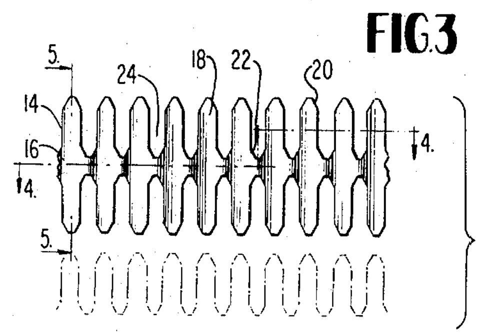
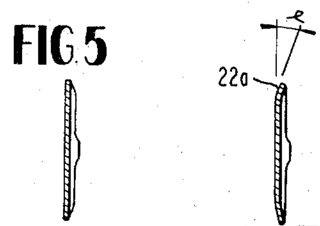
26
FIG.4
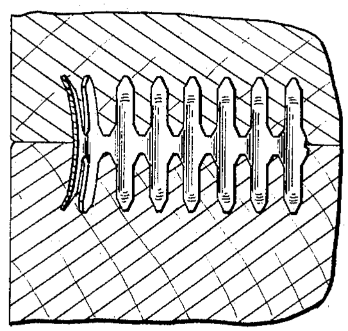
FIG.7
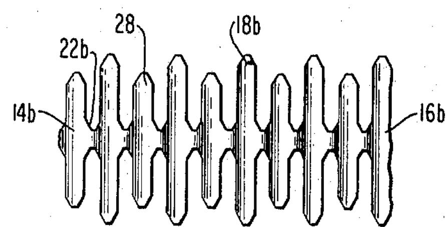
FIG.8
INVENTOR
RICHARD E. HEISE
BY Le Blanc & Shur
ATTORNEY DOUBLE-ENDED FASTENER
Filed Aug. 27, 1968 2 Sheets-Sheet 2
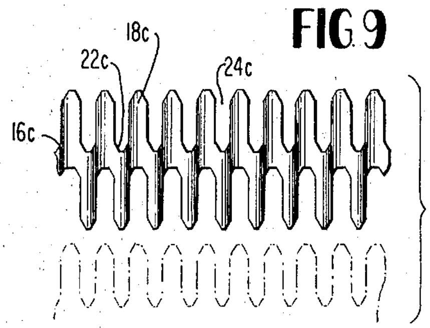
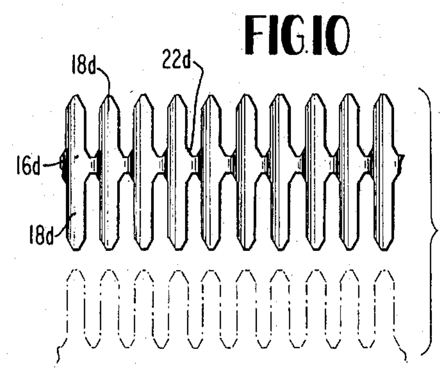
FIG 11
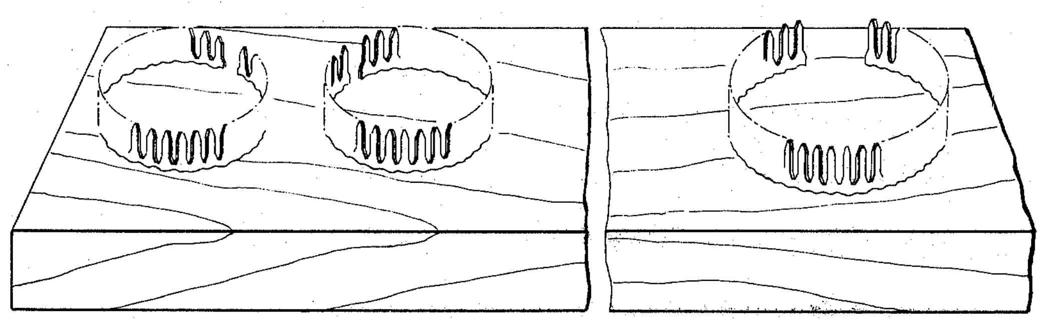
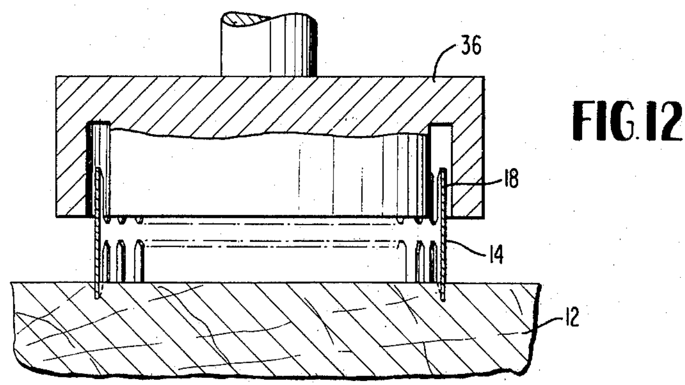
FIG 12
INVENTOR
RICHARD E. HEISE
BY Le Blanc & Shur
ATTORNEY 3,485,518

DOUBLE-ENDED FASTENER

Richard E. Heise, South Miami, Fla., assignor to Automated Building Components, Inc., Miami, Fla., a corporation of Florida Filed Aug. 27, 1968, Ser. No. 755,673
Int. Cl. F16b *5/00, 13/00*
U.S. Cl. 287—20.92 18 Claims

ABSTRACT OF THE DISCLOSURE

The double-ended fastener comprises an elongated sheet metal body having a plurality of longitudinally spaced elongated narrow teeth extending in opposite lateral directions and in the plane of the body. The fastener is disposed between a pair of members to be joined and the members are pressed toward one another to embed the teeth of the fastener into the members. The body portion of the fastener together with its teeth form a continuous groove in each of the members and the body portion at the joint interface prevents shearing action between the members.

The present invention relates to a fastener for joining butting members, one to the other, and particularly relates to a double ended hidden fastener for joining members capable of receiving nails to form laminated beams and the like.

Many types of fasteners have been proposed and constructed for joining two or more members, each to the other. Most fasteners are of the type which are driven through one member into one or more of the other members or into the side portions of each member simultaneously. In each case, portions of the fastener remain fully exposed. This is undesirable, particularly in finished joints, as the exposed portions of the fasteners detract from the appearance of the joints and must be painted over or otherwise covered. A number of fasteners have heretofore been proposed and constructed wherein the fasteners are completely hidden from view. One such fastener comprises an elongated, transversely corrugated, steel strip having sharpened longitudinal edges whereby the fastener may be disposed between the members to be joined and the members pressed together to embed the sharpened corrugations into the opposite members. Corrugated fasteners of this type, however, do not provide adequate withdrawal resistance and the joined members can be separated with minimum force. Another type of hidden fastener comprises an elongated strip of metal formed to provide triangular shaped prongs or teeth along opposite edges of the fastener. The triangular teeth on one side of the fastener are longitudinally offset from the triangular teeth on the opposite side of the fastener such that the tips of the teeth on one side of the fastener lie in transverse alignment with the spaces between adjacent teeth on the other side. This fastener has not proved completely satisfactory as the triangular type teeth do not provide adequate resistance to withdrawal and the members again may be separated with minimum force. Additionally, distortion of the teeth upon embedment thereof into the members sometimes occurs as the teeth on opposite sides of the fastener are offset one from the other creating a transverse shearing force on the body of the fastener.

The present invention provides a fastener which minimizes the above-discussed and other shortcomings of prior fasteners and provides various advantages in construction, mode of use, and result over such prior fasteners. Particularly the present invention provides a fastener comprised of an elongated sheet metal body having a plurality of longitudinally spaced elongated narrow nail-like teeth extending in opposite lateral directions and in the plane of the body. The teeth on each side of the body have pointed tips and are preferably constant in cross section throughout their lengths, the teeth having a length to width ratio of at least three. To form a joint, the fastener is disposed between a pair of joint members and the latter are pressed together to embed the teeth into each member until the members are finally secured one to the other with opposite faces lying in butting relation.

By employing the foregoing described slender tooth configuration, not only is effective penetration of the teeth into the opposite members of the joint obtained, but a high withdrawal resistance is also provided whereby the members of the joint cannot be readily separated. In a preferred form hereof, the teeth on one side of the fastener form a columnar extension of and lie in lateral alignment with the corresponding teeth on the other side of the fastener whereby the axial loads on the teeth upon embedment thereof into the joint members and in response to separating movement of the joined members, are not transferred to the body portion of the fastener. In this manner, distortion or tearing of the fastener is precluded. In another form hereof, the teeth on each side of the fastener alternate in length whereby a reduced number of teeth are provided for starting the teeth into the associated member of the joint. This is particularly desirable when the fastener joins harder woods wherein nails which are all of the same length would tend to undesirably depress the wood surface upon embedment therein. In a still further form of fastener hereof, the teeth on one side of the fastener are shortened relative to the teeth on the opposite side whereby a joint member having a reduced thickness can be joined with such shortened teeth embedded therein to another member having sufficient thickness to receive the other longer teeth, for example when joining sheathing to a stud.

It is a specific feature of the present invention that the body of the fastener which joins the longitudinally spaced teeth, one to the other, forms shoulder portions between the adjacent teeth on each side of the fastener, which, when the fastener is fully embedded into the adjoining members, form, with the teeth, a continuous groove in the joined members. The shoulder portions of the fastener body on each side thereof lie in parallel planes. In this manner, a continuous groove is formed in each of the joined members and a continuous portion of sheet metal lies at the interface of the joined members. Thus, shearing action between the joined members is applied directly to and resisted by the continuous sheet metal body portion without interruption which might otherwise cause distortion of the fastener. Moreover, by providing this intermediate body portion, the extent of penetration on each side of the fastener is controlled such that the continuous metal body portion is always located at the interface of the joint members regardless of the relative hardness of the members of the joint, the length of the teeth on opposite sides of the fastener and other factors. For example, to form a joint between a pair of wooden members having a different hardness, the teeth embedded into the softer wood will necessarily be embedded to their full extent prior to the full embedment of the teeth entering the harder wood. However, the resistance to further insertion of the fastener into the softer member is substantially increased when the waist or body portion of the fastener engages the softer member. This combined resistance of the teeth and waist portion to embedment in the softer member is sufficiently greater than the resistance to embedment of the teeth entering the harder wood such that the latter teeth are then fully embedded into the harder wood upon further pressing of the joint member toward one another. When all of the teeth except for the body portion of the fastener are embedded into the adjoining members, further pressing of the members toward one another embeds the waist or body portion of the fastener into each of the members thereby forming a continuous groove in each member and locating a continuous sheet metal portion of the fastener at the interface of the members. In this manner, a continuous sheet of metal is located at the joint interface to resist the shear loads between the joint members.

It is a further feature of the present invention that by spacing a plurality of the fasteners hereof between a pair of elongated members and pressing such members toward one another, a laminated beam can be formed. Additionally, by selectively spacing the fasteners hereof along the beam members, the resulting beam can be reinforced at areas of maximum shear. For example, it has been found that laminated beams, i.e., those used in churches, auditoriums, etc., are ordinarily loaded in a manner such that the shear loading is greatest at the ends of the beams and obtains a minimum value intermediate the ends of the beams. Accordingly, it is desirable to reinforce the joint between the laminated members of the beam in shear at the ends of the beam. In one form hereof, this is accomplished by forming the fastener strips in a closely spaced serpentine fashion adjacent the ends of the beam to provide additional teeth thereat whereas the fastener strips employed intermediate the beam ends can be disposed in a more widely spaced serpentine fashion. Another manner of accomplishing this is to provide fastener strips in arcuate configurations. Such fasteners can then be disposed along the beam members such that the ends of the arcuate strips adjacent the beam ends are closer together than are the ends of the arcuate fasteners in the center of the beam. This provides additional teeth and additional metal at the beam ends where the shear load is greatest. It will be appreciated that the fastener strip is completely flexible in that a selected number of teeth and the predetermined quantity of sheet metal afforded thereby at the joint interface can be provided at any position along the beam as desired and that the strip may take forms other than the serpentine and arcuate forms hereinbefore discussed.

Accordingly, it is a primary object of the present invention to provide an improved fastener for joining butting members which are capable of receiving a nail.

It is another object of the present invention to provide an improved double-ended hidden fastener for joining butting members and which has a high resistance to withdrawal in the members.

It is still another object of the present invention to provide a double-ended hidden fastener for joining butting members and which provides an optimum resistance in shear.

It is a related object of the present invention to provide a double ended hidden fastener which is readily and easily embedded into the adjoining members and which is free of distortion upon embedment.

It is a further object of the present invention to provide a double-ended hidden fastener of the type having a plurality of elongated nail-like teeth projecting laterally in opposite directions therefrom and which can be readily and easily manufactured at low cost and without waste of sheet metal material.

It is a still further object of the present invention to provide a joint employing a hidden fastener of the type having the foregoing characteristics.

It is a still further object of the present invention to provide a laminated beam structure employing a hidden fastener of the type having the foregoing characteristics and which beam structure can be readily and easily selectively reinforced in shear at predetermined positions therealong.

These and further objects and advantages of the present invention will become more apparent upon reference to the following specification, claims, and appended drawings wherein:

FIGURE 1 is a perspective exploded view of a laminated beam formed of a pair of elongated members joined together by means of a double-ended fastener constructed in accordance with the preset invention;

FIGURE 2 is an enlarged fragmentary cross-sectional view of the laminated beam and illustrating the fastener hereof in fully-embedded position;

FIGURE 3 is a fragmentary side elevational view of the fastener hereof;

FIGURE 4 is a cross-sectional view thereof taken about on line 4—4 of FIGURE 3;

FIGURE 5 is a cross-sectional view thereof taken about on line 5—5 of FIGURE 3;

FIGURE 6 is a view similar to FIGURE 5 and illustrating another form of tooth for the fastener hereof;

FIGURE 7 is a fragmentary cross-sectional view of a fastener having the tooth form shown in FIGURE 6 and shown arranged in an arcuate configuration fully embedded into the joint members;

FIGURES 8 through 10 are fragmentary side elevational views of various forms of fasteners constructed in accordance with the present invention;

FIGURE 11 is an enlarged fragmentary perspective view of the fastener hereof arranged in an arcuate formation and fully embedded into one of the joint members with the other joint member removed; and FIGURE 12 is a vertical cross sectional view illustrating a press for starting the fastener hereof into one of the joint members;

Referring now to the drawings and particularly to FIGURE 1, there is shown a pair of members 10 and 12 which are joined together in lengthwise face to face butting relation by a plurality of fasteners indicated at 14 to form a laminated beam. Members 10 and 13 would normally be formed of wood and may comprise any type of material capable of receiving and retaining a nail. The fasteners 14 are of the double-eneded type and, as seen in FIGURE 2, the opposite ends of fasteners 14 are embedded into the respective members of the beam retaining them in face to face butting relation, one with the other, with the fastener being hidden from view in the finally assembled joint.

Referring now particularly to FIGURES 3 and 4, fastener 14 comprises sheet metal material formed to provide a body or waist 16 having a plurality of longitudinally spaced elongated narrow nail-like teeth 18 extending from body 16 in opposite directions and in the plane of body 16. Body 16 and teeth 18 are struck integrally from an elongated blank of sheet metal, preferably 18 U.S. standard gauge. The side edges adjacent the tips of the teeth are cut back as at 19 to form pointed teeth tips 20. Shoulders 22 are provided on opposite sides of teeth 18 adjacent their base portions and integral juncture with body portion 16 whereby the shouldered portions 22 on opposite sides of an adjacent pair of teeth form lateral edge portions of the body 16. The teeth 18 are struck such that the spaces 24 between adjacent teeth on opposite sides of body 16 have a width equal to the width of teeth 18 with the edge portion of body 16 including shoulders 22 between adjacent teeth having a configuration complementary to the pointed tips 20 of the teeth. It will thus be seen that a plurality of laterally adjacent strips of fasteners can be struck from a sheet metal blank without waste of metal. In other words, the spaces 20 between adjacent teeth and defined by the edges of such adjacent teeth and the shoulders 22 have an outline identical to teeth 18 whereby the teeth of laterally adjacent strips struck from the same sheet metal blank lie, in effect, in meshing engagement and longitudinally offset one from the other a full tooth width.

As seen in FIGURE 4, teeth 18 are struck in a V-shape cross-section as indicated at 26 (FIGURE 4) and the fastener 14 is thus provided with a corrugated effect in cross section. In the form of fastener illustrated in FIGURES 3 through 5, the teeth 18 on each side of the body 16 lie in lateral alignment with the corresponding teeth on the opposite side of body 16 whereby the teeth on each side form columnar extensions of the corresponding teeth on the other side of the fastener. The V-shaped cross section of teeth 18 is also provided across the portion of body 16 lying between the laterally corresponding teeth such that the V-shaped cross section is continuous from the tips of the teeth on one side of body 18 to the tips of the teeth on the other side of body 16. This is a significant feature as the teeth thus do not subject the body portion between adjacent teeth, to shear stresses which might rupture or otherwise deform the fastener upon embedment into the butting members forming the joint.

In use, the fastener strips 14 are located between the members to be joined with the teeth being disposed generally normal to the faces of such members. For example, the strips can be arranged in serpentine fashion along the face of one member, as seen in FIGURE 1, whereby the strips are supported with the teeth thereof lying perpendicular to the face of the member 12. The fastener 14 may be bent to other configurations, such as, for example, the arcuate or circular configuration illustrated in FIGURE 11 or may be applied in longitudinally extending lengths in which case the fastener strips would be started in one of the joint members so that the teeth extend normal thereto. With the fastener strips thus disposed between the joint members the members are pressed toward one another such that the teeth 18 on opposite sides of fastener body 16 are embedded into the respective members. Note that the loading on the teeth on one side of body 16 upon embedment thereof into the associated member of the joint is transferred axially along the tooth through the body 16 directly to the corresponding tooth 18 on the other side of body 16 which, in turn, is being embedded into the corresponding member of the joint. Thus, the axial loadings on the teeth on one side of the fastener are transferred directly to the teeth on the other side of the fastener whereby the body portion 16 is not subjected to shear loadings and hence is not deformed.

As the members are pressed toward final securement in butting face to face relation, the shouldered portions 22 between adjacent teeth on each side of body 16 engage and are embedded into the opposite faces of the joint members whereby such shouldered portions cooperate with the teeth 18 to form a continuous groove in each of the joint members. In other words, a continuous band of metal comprising generally the opposite halves of body portion 16 is embedded into each of the joint members. This is significant as any shearing action between the joint members at their interface is applied to the continuous sheet metal body, there being no discontinuity in the metal at the shear interface. Note also that when the joint members are finally secured in butting face to face relation (FIGURE 2), the fastener 14 is fully hidden from view and does not detract from the appearance of the joint.

The slender elongated nail-like teeth 18 have a high withdrawal resistance in both members of the joint whereby separating action of such joint members is effectively resisted. To further increase the resistance to withdrawal of this type of fastener, there is shown in FIGURE 6 a fastener similarly constructed as previously described and having a tip portion **22*a* bent over in the direction of the concave side of the tooth. For example, the tip 22*a*** may be bent through an angle *e* of 10 degrees. Thus, when opposite ends of the teeth are embedded into the respective members of the joint, as previously described, the teeth, tend to bend about a transverse axis as seen in FIGURE 7 providing a clenching action in the members of the joint.

Referring now to FIGURE 8, there is shown another form of fastener **14*b* wherein the teeth 18*b* on opposite sides of body 16*b*** are formed to provide alternately long and short teeth. This type of nail arrangement provides for ease of starting or initial penetration of the nails into the members of the joint and is particularly desirable with harder type woods wherein nails, all of the same length and closely spaced, one to the other, tend to depress the wood surface upon embedment. The fastener in this form is otherwise similar to the fastener illustrated in FIGURES 3 through 5.

In FIGURE 9, there is shown an alternate arrangement of teeth in a form fastener otherwise similar to the fastener of FIGURES 3 through 5. The fastener, in this form, is struck from the sheet metal blanks such that the teeth **18*c* on opposite sides of body portion 16*c* are longitudinally displaced a full tooth width, each from the other. In other words, the space 24*c* lying between adjacent teeth 18*c* on one side of body 16*c* lies in lateral alignment with the teeth formed on the other side of body 16*c*. This may be desirable in the softer type woods wherein the shear stresses across the body 16*c* upon embedment of teeth 18*c*** into the members of the joint, are minimal.

Referring now to FIGURE 10, there is shown another form of fastener hereof, particularly adapted for use with joint members, one of which is reduced in thickness. For example, boards, panelling, sheeting and the like may be secured to studding by use of this type of fastener. In this form, the teeth **18*d* formed on one side of body 16*d* are shorter in length than the teeth 18*d'* formed on the opposite side of body 16*d*. Thus, the longer teeth 18*d'* can be embedded into a stud while the shorter teeth 18*d* can be embedded into the rear face of the board, panel, or the like. The members of the joint would then be pressed togeher as before securing them in butting face to face relation without the possibility of the shortened teeth 18*d*** fully penetrating through the board, panel or the like.

It is significant that the shouldered portions 22 on opposite sides of body 16 and between adjacent teeth in each of the forms of fasteners hereof, lie in substantially parallel planes, one to the other. Where the joint members are of different hardness, or where the teeth on one side of the fastener are longer in length than the teeth on the other side of the fastener, it will be appreciated that, under normal conditions, the teeth being embedded into the softer member of the joint or the teeth which are shorter in length, will be embedded for their full lengths prior to full embedment of the teeth on the opposite side of the fastener. The shouldered portions 22 of body 16, however, prevent the asymmetrical location of body 16 relative to the joint members. In other words, the shouldered portions 22 operate to locate the body 16 at the joint interface with the shoulder portions embedded substantially equal distances into the associated members of the joint, thus disposing a continuous sheet of metal across the joint interface in continuous grooves formed in the joint members. It will be seen that when the shouldered portions 22 on one side of the fastener engages the face of the associated member of the joint, the resistance to further insertion of the fastener into such joint member is substantially increased. This substantial increase in resistance permits the further insertion of the teeth on the opposite side of the fastener into the other joint member whereby further movement of the joint members toward one another embeds the teeth on each side of the fastener up to the respective shouldered portions substantially prior to embedment of either shoulder portion of body 16 into its respective joint member. Thus, regardless of the differing hardness of the members of the joint, or the fact that the fastener has different lengths of teeth on opposite sides thereof, body 16 will always be located as to intersect and thereby provide a continuous sheet of metal at the interface of the joint members.

In a preferred embodiment hereof, i.e., the fastener illustrated in FIGURES 3 through 5, the fastener strips 14 are formed of 18 U.S. standard gauge galvanized sheet metal although other metal thicknesses could be employed, for example 20 U.S. standard gauge galvanized sheet metal. Thes teeth have lengths from tip to tip of one inch and a tooth width of .125 inch. The teeth thus have a preferred length to width ratio of at least three. The width of body portion 16 is .125 and it will be seen that the ratio of the body portion width to the length of each tooth is .28 and should be no greater than .35. Inasmuch as laterally adjacent fasteners struck from the sheet metal blank are complementary one to the other, the spacing 20 between adjacent teeth 18 is also .125 inch. The pointed tips of the teeth have an included angle of 50 degrees.

It is a significant feature hereof that the present fasteners can be employed to form laminated beams and the like and may be selectively applied to the beam members, particularly for those beams subjected to varying shear loadings throughout their lengths at areas along the beam subject to maximum anticipated loading. For example, many beams employed in churches, auditoriums, and the like are loaded in a manner wherein the shear loading is greatest at the ends of the beams and minimal at its center. Accordingly, it is desirable to provide the greatest resistance in shear at the ends of the beams. To accomplish this and with reference to FIGURE 1, the leg portions of the serpentine bent fastener strip adjacent opposite ends of the beam are spaced closer together one to the other than are the leg portions of the serpentine bent strip employed medially of the beam. Thus, shear resistance quantity of metal disposed at the interface of members 10 and 12 is sharply increased at the opposite ends of the beam in comparison with the quantity of sheet resistive metal located at the interface of the beam medially of the beam ends. Moreover, the number of teeth at a particular area along the beam is selectively increased or decreased in a like manner whereby greater or lesser resistance to separating motion of the members can be provided as desired. In this manner, the greater metal and teeth density are readily provided in the areas of maximum anticipated loading and a reduced quantity of metal is provided in the areas of minimum loading thereby eliminating wastage of metal and overdesign of the beam.

Instead of bending the fastener strips in serpentine fashion, the strips may be bent into arcuate or circular shape as seen in FIGURE 11. At the ends of the beams where the shear loading is greatest, the fastener strips can thus be bent to form a substantially closed circle to provide a higher tooth density and increased metal at the end portions of the beam. As seen in the right hand portion of FIGURE 11, the like length fastener strips disposed intermediate the ends of the beams and subjcted to minimum shear loading, can be formed into circular configurations having larger diameters.

In FIGURE 12 there is shown a press for starting arcuately disposed fastener strips. The press may comprise a cylindrical block 36 having an annular recess formed therein for receiving the teeth 18 of fastener 14. The depth of the groove is slightly less than the overall length of teeth 18. Thus, when the base of the recess seats the upper ends of the teeth 18 on one side of body 16, the tips of the teeth 18 on the other side of body 16 project beyond the face of the cylindrical member 36 a distance sufficient to start the teeth on the other side of body 16 into member 12, when cylindrical member 36 is hammered or otherwise pressed toward the joint member 12. Member 36 is then removed and the opposite joint members are then pressed toward one anotnher to fully embed the teeth and body portion 16 therein.

It is thus apparent that the objects of the present invention are fully accomplished in that there is provided a double-ended fastener strip which can be readily and economically formed without waste from a sheet metal blank. Moreover, the double-ended fastener hereof is formed such that the teeth along its opposite sides are in axial alignment, one with the other, whereby distortion or other deformation or weakening of the fastener is substantially eliminated. Additionally, by providing the shouldered portions between adjacent teeth on opposite sides of the fastener in parallel planes, the body portion of the fastener is automatically located at the interface of the joint whereby the continuous sheet metal shear resistant waist of the strip is embedded into the opposite joint members. Further, the fastener hereof may be bent into predetermined forms whereby the teeth and the body metal can be selectively distributed throughout the joint and applied particularly in those areas subjected to maximum loading.

The invention may be embodied in other specific forms without departing from the spirit or essential characteristics thereof. The present embodiments are therefore to be considered in all respects as illustrative and not restrictive.

What is claimed and desired to be secured by United States Letters Patent is:

1. A fastener for forming a butt joint between a pair of members comprising an elongated sheet metal plate having a longitudinally extending continuous body portion and a plurality of longitudinally spaced, elongated, nail-like teeth extending in opposite lateral directions normal to the longitudinal axis of said body portion and in the plane thereof for embedment into the respective members, said teeth having substantially parallel side edges and a length to width ratio of at least three, the ratio of the width of said body portion to the length of said teeth on each side of said body being no greater than .35, said body portion including shoulder portions between each of said teeth on opposite sides of said body portion for embedment into the butting faces of the respective members, the shoulder portions on each side of said body portion lying in a common plane extending normal to said plate and parallel to said axis, said planes lying in laterally spaced parallel relation one to the other.

2. A fastener according to claim 1 wherein the teeth extending laterally to one side of said body portion lie in axial alignment with the teeth extending laterally to the opposite side of said body portion.

3. A fastener according to claim 1 wherien the tips of said teeth are bent to project out of the plane containing said sheet metal body and said teeth.

4. A fastener according to claim 1 wherein said sheet metal body portion is bent to form an arcuate configuration about an axis parallel to the longitudinal axes of said teeth, the tips of said teeth projecting outwardly of said arcuate body formation.

5. A fastener according to claim 1 wherein the next adjacent teeth on each side of said body portion are different in length, alternate teeth on each side of said body portion having like lengths.

6. A fastener according to claim 1 wherein the space between adjacent teeth on each side of said body portion is at least as wide as the width of said teeth, the teeth on one side of said body portion lying laterally opposite the space between next adjacent teeth on the opposite side of said body portion.

7. A fastener according to claim 1 wherein the teeth on one side of said body portion have a length greater than the length of the teeth on the other side of said body portion.

8. A fastener according to claim 2 wherein said teeth are bent to form concave and convex face portions on respective opposite sides of said plate, said body portions between the aligned teeth being bent to form concave and convex face portions on respective like sides of said teeth whereby the concave and convex portions extend continuously across said fastener throughout the full length of the axially aligned teeth from tip to tip.

9. Fastener according to claim 8 wherein said concave and convex portions of said teeth and body portion are substantially V-shaped in cross section.

10. A joint comprising a pair of members having opposite faces in butting relation, a fastener for retaining said members in face to face butting relation comprising an elongated sheet metal plate having a longitudinally extending continuous body portion and a plurality of longitudinally spaced, elongated, nail-like teeth extending in opposite directions normal to the longitudinal axis of said body portion in the plane thereof, said teeth having substantially parallel side edges and a length to width ratio of at least three, the teeth on one side of said body portion being embedded into one of said members and the teeth on the other side of said body portion being embedded into the other of said members, said body portion including shoulder portions between each of said teeth on opposite sides of said body portion, the shoulder portions on each side of said body portion lying in a common plane extending normally to said plate and parallel to said axes, said planes lying in laterally spaced parallel relation one to the other, said shoulder portions and said teeth being embedded into the associated members such that said body portion extends into each member to provide a continuous metal sheet portion along the interface of said members throughout the length of said fastener.

11. A joint according to claim 10 wherein the teeth extending laterally to one side of said body portion and embedded into said one member lie in axial alignment with the teeth extending laterally to the other side of said body portion and embedded into said other member.

12. A joint according to claim 11 wherein said sheet metal body portion is bent to form an arcuate configuration about an axis generally parallel to the longitudinal axes of said teeth.

13. A laminated beam comprising a pair of elongated members having opposite faces in butting relation, a plurality of fasteners spaced along said members for retaining said members in face to face butting relation, each of said fasteners comprising an elongated sheet metal plate having a longitudinally extending continuous body portion and a plurality of longitudinally spaced, elongated, nail-like teeth extending in opposite directions normal to the longitudinal axis of said body portion and in the plane thereof, said teeth having substantially parallel side edges and a length to width ratio of at least three, the teeth on one side of said body portion being embedded into one of said members and the teeth on the other side of said body portion being embedded into the other of said members, said body portion including shoulder portions between each of said teeth on opposite sides of said body portion, said teeth and said shoulder portions being embedded into the associated members such that said body portion extends into each member to provide a continuous metal sheet portion along the interface of said members throughout the length of said fastener, said fasteners being arranged along said beam such that the density of the teeth embedded into said members adjacent the ends of the beams is greater than the density of the teeth embedded into said members intermediate the ends of the beam.

14. A beam according to claim 13 wherein said fasteners are provided in strips bent in serpentine form about axes parallel to the longitudinal axis of said teeth.

15. A beam according to claim 14 wherein the leg portions of the serpentine arranged fasteners adjacent the ends of the beam are more closely spaced one to the other than the leg portions of the serpentine arranged fasteners intermediate the beam ends.

16. A beam according to claim 13 wherein said fasteners are provided in strips bent about an axis parallel to the axes of said teeth to form an arcuately arranged configuration.

17. A beam according to claim 16 wherein said strips are equal in length and bent in circular segments, the diameter of the circular strip segments adjacent the ends of said beam being smaller than the diameter of the circular strip segments intermediate the beam ends.

18. A beam according to claim 13 wherein said members are coextensive in length.

References Cited

UNITED STATES PATENTS

| | | | |
|---|---|---|---|
| 1,036,229 | 8/1912 | Harrild | 85—14 |
| 1,598,199 | 8/1926 | Johansson et al. | |
| 2,060,080 | 11/1936 | Horner. | |
| 2,235,300 | 3/1941 | Ramey | 85—49 X |
| 2,495,337 | 1/1950 | Lindham | 85—14 |
| 2,558,132 | 6/1951 | Green | 85—14 |

FOREIGN PATENTS

| | | |
|---|---|---|
| 490,541 | 2/1953 | Canada. |

RAMON S. BRITTS, Primary Examiner

U.S. Cl. X.R.

85—13, 14

PO-1050 (5/69)

UNITED STATES PATENT OFFICE

CERTIFICATE OF CORRECTION

Patent No. 3,485,518 Dated December 23, 1969

Inventor(s) RICHARD E. HEISE

It is certified that error appears in the above-identified patent and that said Letters Patent are hereby corrected as shown below:

Column 4, line 3, "presei should read -- present --; line 33, "13" should read -- 12 --; line 36, "eneded" should read -- ended --. Column 7, line 1, "Thes" should read -- The --; line 50, "subjcted" should read -- subjected --; line 66, "anotnher" should read -- another --. Column 8, line 41, "wherien" should read -- wherein --

Signed and sealed this 30th day of June 1970.

(SEAL)
Attest:

EDWARD M. FLETCHER, JR.
Attesting Officer

WILLIAM E. SCHUYLER, JR.
Commissioner of Patents